(12) United States Patent
Murata et al.

(10) Patent No.: US 10,821,967 B2
(45) Date of Patent: Nov. 3, 2020

(54) CONTROL DEVICE AND TEMPERATURE DETECTION CONDITION DETERMINATION METHOD FOR MOTOR SYSTEM

(71) Applicant: Mitsubishi Electric Corporation, Tokyo (JP)

(72) Inventors: Yasukazu Murata, Hyogo (JP); Keiichi Enoki, Tokyo (JP); Masutaka Watanabe, Tokyo (JP); Yoshimasa Nishijima, Tokyo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 470 days.

(21) Appl. No.: 15/810,281

(22) Filed: Nov. 13, 2017

(65) Prior Publication Data

US 2018/0154887 A1 Jun. 7, 2018

(30) Foreign Application Priority Data

Dec. 1, 2016 (JP) .................................. 2016-233914

(51) Int. Cl.
*B60W 20/50* (2016.01)
*H02P 29/60* (2016.01)
(Continued)

(52) U.S. Cl.
CPC .............. *B60W 20/50* (2013.01); *B60K 6/46* (2013.01); *B60W 10/08* (2013.01);
(Continued)

(58) Field of Classification Search
CPC .. B60W 20/50; B60W 30/1843; B60W 10/08; B60W 2510/087; B60W 2710/083;
(Continued)

(56) References Cited

U.S. PATENT DOCUMENTS

2008/0230302 A1* 9/2008 Tamaki ................ B62D 5/0463
180/443
2014/0091740 A1* 4/2014 Suzuki .................... H02P 21/22
318/400.02
(Continued)

FOREIGN PATENT DOCUMENTS

JP 7-312802 A 11/1995
JP 2008-230540 A 10/2008

*Primary Examiner* — Jeffrey C Boomer
(74) *Attorney, Agent, or Firm* — Sughrue Mion, PLLC; Richard C. Turner

(57) ABSTRACT

A temperature detection condition of a temperature detection unit used in a motor system is determined by: obtaining a phase current value flowing through a motor device and obtaining a temperature detection value; calculating, as an integrated phase current value, at least one of a first integrated phase current value, which is obtained by integrating an amount by which the phase current value exceeds a first phase current threshold, and a second integrated phase current value, which is obtained by integrating an amount by which the phase current value is smaller than a second phase current threshold that is equal to or smaller than the first phase current threshold; and determining an amount of variation in the temperature detection value detected by the temperature detection unit following the start of determination of the temperature detection condition and an amount of variation in the calculated integrated phase current value.

6 Claims, 13 Drawing Sheets

(51) Int. Cl.
*H02P 29/68* (2016.01)
*H02P 29/024* (2016.01)
*B60W 10/08* (2006.01)
*B60W 30/184* (2012.01)
*B60K 6/46* (2007.10)
*H02P 5/00* (2016.01)

(52) U.S. Cl.
CPC ........... *B60W 30/1843* (2013.01); *H02P 5/00* (2013.01); *H02P 29/024* (2013.01); *H02P 29/60* (2016.02); *H02P 29/68* (2016.02); *B60W 2510/087* (2013.01); *B60W 2710/083* (2013.01)

(58) Field of Classification Search
CPC .. H02P 5/00; H02P 29/68; H02P 29/60; H02P 29/024; B60K 6/46
See application file for complete search history.

(56) References Cited

U.S. PATENT DOCUMENTS

| | | | | |
|---|---|---|---|---|
| 2014/0152205 A1* | 6/2014 | Nakai | ............... | H02P 21/05 318/400.02 |
| 2016/0126877 A1* | 5/2016 | Endoh | ............ | B62D 5/0409 318/400.02 |
| 2016/0276975 A1* | 9/2016 | Fujishima | ............ | H02P 29/685 |
| 2019/0047613 A1* | 2/2019 | Kano | ............... | H02P 25/03 |

* cited by examiner

CONTROL DEVICE AND TEMPERATURE DETECTION CONDITION DETERMINATION METHOD FOR MOTOR SYSTEM

BACKGROUND OF THE INVENTION

1. Field of the Invention

This invention relates to a control device and a temperature detection condition determination method employed in a motor system in order to determine a temperature detection condition of a temperature detection unit used in the motor system.

2. Description of the Related Art

In recent years, hybrid vehicles, electric vehicles, and the like have come to attention as vehicles manufactured with the aim of saving energy and protecting the environment. A hybrid vehicle uses a motor as a power source in addition to a conventional engine, while an electric vehicle uses a motor as a power source. Both types of vehicles run by converting DC power stored in a battery into AC power using an inverter circuit, and driving the motor by supplying the AC power to the motor.

Further, the battery of the hybrid vehicle stores power generated by a motor/generator using rotational energy obtained when the vehicle is driven by the engine, and regenerative power generated by the motor/generator using rotational energy obtained from the tires during coasting.

To protect a motor, an inverter, and a battery of a motor system installed in a vehicle such as those described above, a temperature sensor is used to detect respective temperatures thereof. When a fault such as a short circuit or a disconnection occurs in the temperature sensor, however, an abnormality (referred to hereafter as a sticking abnormality) in which the detection value of the temperature sensor becomes stuck at a substantially fixed value occurs. Accordingly, the temperature sensor cannot measure the temperatures accurately, and as a result, the motor system cannot be protected appropriately. Hence, in consideration of this problem, a technique for detecting a sticking abnormality in a temperature sensor has been proposed (see Japanese Patent Application Publication H7-312802, for example).

The conventional technique described in Japanese Patent Application Publication H7-312802 is configured such that when a value obtained by time-integrating an absolute value of a torque command for controlling a motor exceeds a predetermined value, the motor and an inverter are determined to have overheated to a temperature at which it is possible to determine the occurrence of a disconnection in a thermistor temperature sensor mounted on the motor and the inverter. Furthermore, if the temperature detected by the thermistor temperature sensor has not reached a predetermined temperature when this determination is made, a fault is determined to have occurred in the thermistor temperature sensor.

SUMMARY OF THE INVENTION

However, the prior are has the following problem.

As noted above, in the conventional technique described in Japanese Patent Application Publication H7-312802, a fault determination for determining whether or not a fault has occurred in the temperature sensor is implemented using a value obtained by time-integrating the absolute value of the torque command. To implement the fault determination with this configuration, however, the torque command must be either a drive torque value exceeding 0 [Nm] or a regenerative torque value lower than 0 [Nm]. In other words, the fault determination can only be implemented when the value of the torque command is either higher or lower than zero.

With this configuration, therefore, the fault determination cannot be implemented when the torque command remains at zero. More specifically, the fault determination cannot be implemented when, for example, a hybrid vehicle travels without assistance from the motor, or in other words travels at high speed using the engine alone such that the torque command is zero. Likewise, the fault determination cannot be implemented when, for example, the hybrid vehicle travels uphill without assistance from the motor, or in other words travels uphill at a high rotation speed using the engine alone such that the torque command is zero.

This invention has been designed in consideration of the problem described above, and an object thereof is to obtain a control device and a temperature detection condition determination method for a motor system, with which a temperature detection condition of a temperature detection unit used in the motor system can be determined even when a torque command remains at zero.

A control device for a motor system according to this invention determines a temperature detection condition of a temperature detection unit used in a motor system by: obtaining a phase current value flowing through a motor device of the motor system and obtaining a temperature detection value detected by the temperature detection unit; calculating, as an integrated phase current value, at least one of a first integrated phase current value, which is obtained by integrating an amount by which the phase current value exceeds a first phase current threshold, and a second integrated phase current value, which is obtained by integrating an amount by which the phase current value is smaller than a second phase current threshold that is equal to or smaller than the first phase current threshold; and determining an amount of variation in the temperature detection value detected by the temperature detection unit following the start of determination of the temperature detection condition and an amount of variation in the calculated integrated phase current value.

A temperature detection condition determination method for a motor system according to this invention, which is used to determine a temperature detection condition of a temperature detection unit used in the motor system, includes the steps of: obtaining a phase current value flowing through a motor device of the motor system and obtaining a temperature detection value detected by the temperature detection unit; calculating, as an integrated phase current value, at least one of a first integrated phase current value, which is obtained by integrating an amount by which the phase current value exceeds a first phase current threshold, and a second integrated phase current value, which is obtained by integrating an amount by which the phase current value is smaller than a second phase current threshold that is equal to or smaller than the first phase current threshold; and determining the temperature detection condition by determining an amount of variation in the temperature detection value detected by the temperature detection unit following the start of determination of the temperature detection condition and an amount of variation in the calculated integrated phase current value.

According to this invention, it is possible to obtain a control device and a temperature detection condition determination method for a motor system, with which a temperature detection condition of a temperature detection unit used in the motor system can be determined even when a torque command remains at zero.

DESCRIPTION OF THE PREFERRED EMBODIMENTS

Figure 1:
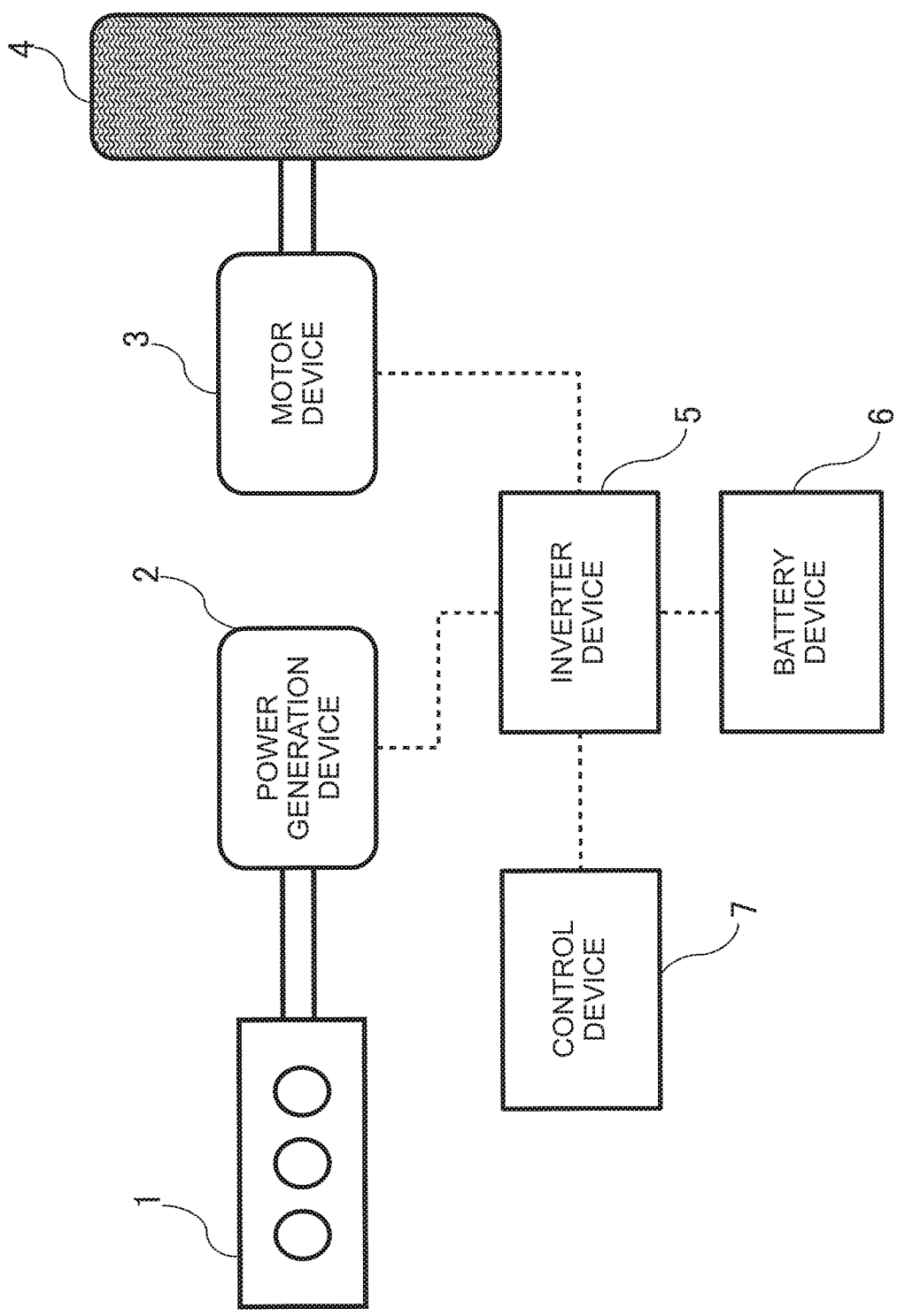
FIG. 1 is a schematic view showing an example configuration of a vehicle to which a control device for a motor system according to a first embodiment of this invention is applied.

Preferred embodiments of a control device and a temperature detection condition determination method for a motor system according to this invention will be described below using the drawings. Note that identical or corresponding parts of the drawings will be described using identical reference numerals, and duplicate description thereof has been omitted.

FIG. 1 is a schematic view showing an example configuration of a vehicle to which a control device 7 for a motor system according to a first embodiment of this invention is applied. In FIG. 1, the vehicle includes a motor system having an engine 1, a power generation device 2, a tire 4, a motor device 3, an inverter device 5, and a battery device 6, and the control device 7 for controlling the motor system.

The power generation device 2 generates power from the driving of the engine 1. The inverter device 5 converts the AC power generated by the power generation device 2 into DC power, and stores the DC power in the battery device 6.

The inverter device 5 supplies the AC power generated by the power generation device 2 or AC power obtained when the DC power stored in the battery device 6 is converted into AC power to the motor device 3. As a result, the motor device 3 is driven, whereby the tire 4 is driven, and thus the vehicle can be caused to travel.

When the vehicle decelerates or the like, the motor device 3 is rotated by the tire 4, whereby the motor device 3 performs power regeneration, and the power generated during power regeneration is charged to the battery device 6 via the inverter device 5. Further, by converting the DC power stored in the battery device 6 into AC power and supplying the AC power to the power generation device 2, the inverter device 5 drives the power generation device 2, and as a result, the engine 1 is started.

The control device 7 controls the motor system and detects an abnormality in a temperature detection unit used in the motor system. Note that the type of abnormality to be considered herein is a sticking abnormality. In other words, the control device 7 has a function for detecting a sticking abnormality in the temperature detection unit in addition to a conventional function for controlling the motor system. The control device 7 also controls various other devices installed in the vehicle, as well as the motor system.

Note that in the first embodiment, a series type hybrid vehicle such as that shown in FIG. 1 is cited as a specific example of a vehicle to which this invention can be applied. However, this invention is not limited thereto, and may also be applied to a parallel type hybrid vehicle, for example.

Here, a series type hybrid vehicle employs the system described above, in which electric power generated using power from the engine 1 is stored in the battery device 6 and the tire 4 is driven by driving the motor device 3 using the power stored in the battery device 6. Hence, a series type hybrid vehicle does not travel using the power of the engine 1, and may therefore be considered as a type of electric vehicle. A parallel type hybrid vehicle, on the other hand, employs a system in which the tires are driven by power from both the motor device and the engine.

Further, in the first embodiment, a case in which the power generation device 2 and the motor device 3 are provided separately will be described, but this invention is not limited thereto, and instead, a motor/generator that performs both driving and power generation may be provided as the power generation device 2 and the motor device 3.

Furthermore, in the first embodiment, a case in which the battery device 6 and the inverter device 5 are respectively provided singly will be described, but this invention is not limited thereto, and instead, a plurality of batteries having different voltages may be provided, and a converter or the like for performing voltage conversion may be provided either between the power generation device 2 and the inverter device 5 or between the battery device 6 and the inverter device 5.

Figure 2:
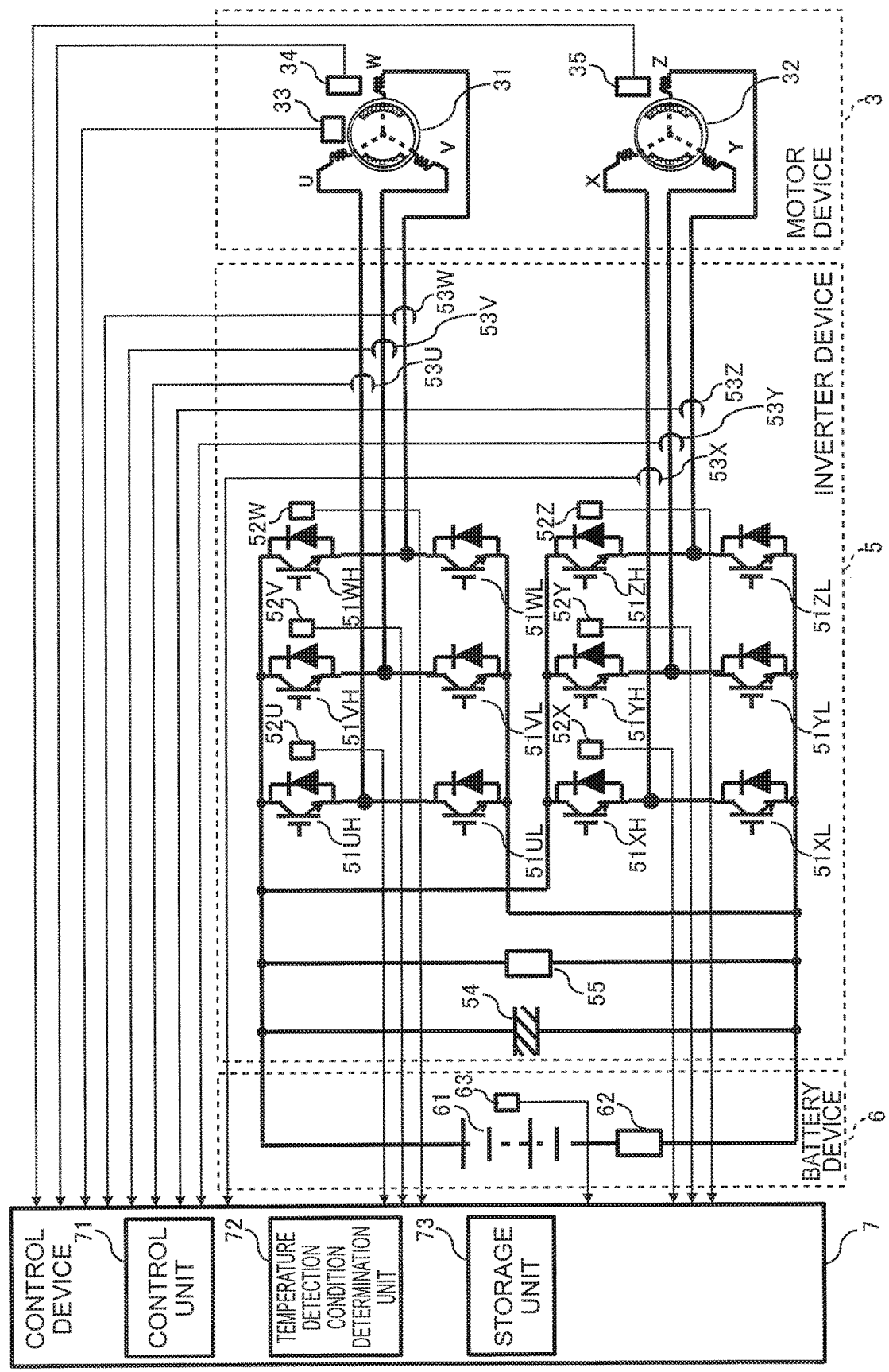
FIG. 2 is a view showing an example configuration of an electric circuit of a motor system to which the control device for a motor system according to the first embodiment of this invention is applied.

Next, an electric circuit of the motor system will be described with reference to FIG. 2. FIG. 2 is a view showing an example configuration of the electric circuit of the motor system to which the control device 7 for a motor system according to the first embodiment of this invention is applied. Note that the power generation device 2 and the part of the circuit of the inverter device 5 that is connected to the power generation device 2 are not shown in FIG. 2.

In FIG. 2, the motor device 3 takes the form of a double three-phase motor. More specifically, the motor device 3 is constituted by a first motor 31 having a first winding group, and a second motor 32 having a second winding group. The first winding group is constituted by a U phase winding, a V phase winding, and a W phase winding. The second winding group is constituted by an X phase winding, a Y phase winding, and a Z phase winding. The first motor 31 and the second motor 32 can be controlled individually.

The motor device 3 is provided with a rotation sensor 33 for detecting a rotation angle or a rotation speed of the first motor 31. Although not shown in FIG. 2, a rotation sensor for detecting the rotation angle or the rotation speed of the second motor 32 may be provided separately. The motor device 3 is also provided with a first winding temperature sensor 34 for detecting the temperature of the first winding group of the first motor 31, and a second winding temperature sensor 35 for detecting the temperature of the second winding group of the second motor 32.

The inverter device 5 takes the form of a double three-phase inverter connected to the double three-phase motor. More specifically, the inverter device 5 is constituted by a U phase switching circuit, a V phase switching circuit, and a W phase switching circuit corresponding to the first winding group, and an X phase switching circuit, a Y phase switching circuit, and a Z phase switching circuit corresponding to the second winding group.

The U phase switching circuit is constituted by an upper arm side switching element 51UH and a lower arm side switching element 51UL. Similarly, the V phase switching circuit is constituted by an upper arm side switching element 51VH and a lower arm side switching element 51VL, and the W phase switching circuit is constituted by an upper arm side switching element 51WH and a lower arm side switching element 51WL.

The X phase switching circuit is constituted by an upper arm side switching element 51XH and a lower arm side switching element 51XL. Similarly, the Y phase switching circuit is constituted by an upper arm side switching element 51YH and a lower arm side switching element 51YL, and the Z phase switching circuit is constituted by an upper arm side switching element 51ZH and a lower arm side switching element 51ZL.

Each of the aforesaid switching elements is constituted by a switching element such as an IGBT or a FET, and a freewheeling diode.

The inverter device 5 is provided with a U phase switching element temperature sensor 52U for detecting the temperature of the U phase switching circuit, a V phase switching element temperature sensor 52V for detecting the temperature of the V phase switching circuit, and a W phase switching element temperature sensor 52W for detecting the temperature of the W phase switching circuit. Similarly, the inverter device 5 is provided with an X phase switching element temperature sensor 52X for detecting the temperature of the X phase switching circuit, a Y phase switching element temperature sensor 52Y for detecting the temperature of the Y phase switching circuit, and a Z phase switching element temperature sensor 52Z for detecting the temperature of the Z phase switching circuit.

By implementing control to switch the respective switching elements ON and OFF, the inverter device 5 converts DC power supplied from the battery device 6 into AC power, and converts AC power supplied from the motor device 3 into DC power.

The inverter device 5 is provided with a U phase current sensor 53U for detecting a current flowing through the U phase winding, a V phase current sensor 53V for detecting a current flowing through the V phase winding, and a W phase current sensor 53W for detecting a current flowing through the W phase winding. Similarly, the inverter device 5 is provided with an X phase current sensor 53X for detecting a current flowing through the X phase winding, a Y phase current sensor 53Y for detecting a current flowing through the Y phase winding, and a Z phase current sensor 53Z for detecting a current flowing through the Z phase winding.

The inverter device 5 is also provided with a smoothing capacitor 54 for smoothing a DC voltage of a battery 61, to be described below, and a voltage sensor 55 for detecting a DC link voltage of the battery 61.

The battery device 6 is constituted by the battery 61 for storing DC power. The battery device 6 is provided with a current sensor 62 for detecting a current flowing through the battery 61. The battery device 6 is also provided with a battery temperature sensor 63 for detecting the temperature of the battery 61.

The control device 7 is realized by, for example, a microcomputer for executing calculation processing, a read only memory (ROM) for storing data such as program data and fixed value data, and a random access memory (RAM) storing data that are updated and successively rewritten. The control device 7 includes a control unit 71 for controlling the motor system, a temperature detection condition determination unit 72 for detecting an abnormality in a temperature detection unit used in the motor system, and a storage unit 73.

A torque command is input into the control unit 71 from a torque command generator (not shown) that generates a torque command for controlling the motor device 3. The control unit 71 generates a d axis current command and a q axis current command corresponding to the torque command input from the torque command generator for each of the first motor 31 and the second motor 32.

Further, the control unit 71 generates a d axis current and a q axis current for each of the first motor 31 and the second motor 32 on the basis of respective phase current values detected by the U phase current sensor 53U, the V phase current sensor 53V, the W phase current sensor 53W, the X phase current sensor 53X, the Y phase current sensor 53Y, and the Z phase current sensor 53Z.

More specifically, the control unit 71 converts a three-phase current constituted by the U phase current, the V phase current, and the W phase current detected respectively by the U phase current sensor 53U, the V phase current sensor 53V, and the W phase current sensor 53W into a d axis current and a q axis current. Similarly, the control unit 71 converts a three-phase current constituted by the X phase current, the Y phase current, and the Z phase current detected respectively by the X phase current sensor 53X, the Y phase current sensor 53Y, and the Z phase current sensor 53Z into a d axis current and a q axis current.

The control unit 71 then implements current control such that the d axis current command and the q axis current command respectively match the d axis current and the q axis current in relation to the first motor 31, and such that the d axis current command and the q axis current command respectively match the d axis current and the q axis current in relation to the second motor 32, and implements control to switch the respective switching elements of the inverter device 5 ON and OFF using a pulse width modulation (PWM) method. By having the control unit 71 implement this control, the motor device 3 can generate torque matching the torque command.

Note that in the case described in the first embodiment, the motor device 3 includes two winding groups, and each winding group includes windings of three phases. This invention is not limited thereto, however, and the motor device 3 may include two or more winding groups, and each winding group may include windings of three or more phases.

Next, the temperature detection condition determination unit 72 will be described with reference to flowcharts shown in FIGS. 3 to 8.

Figure 3:
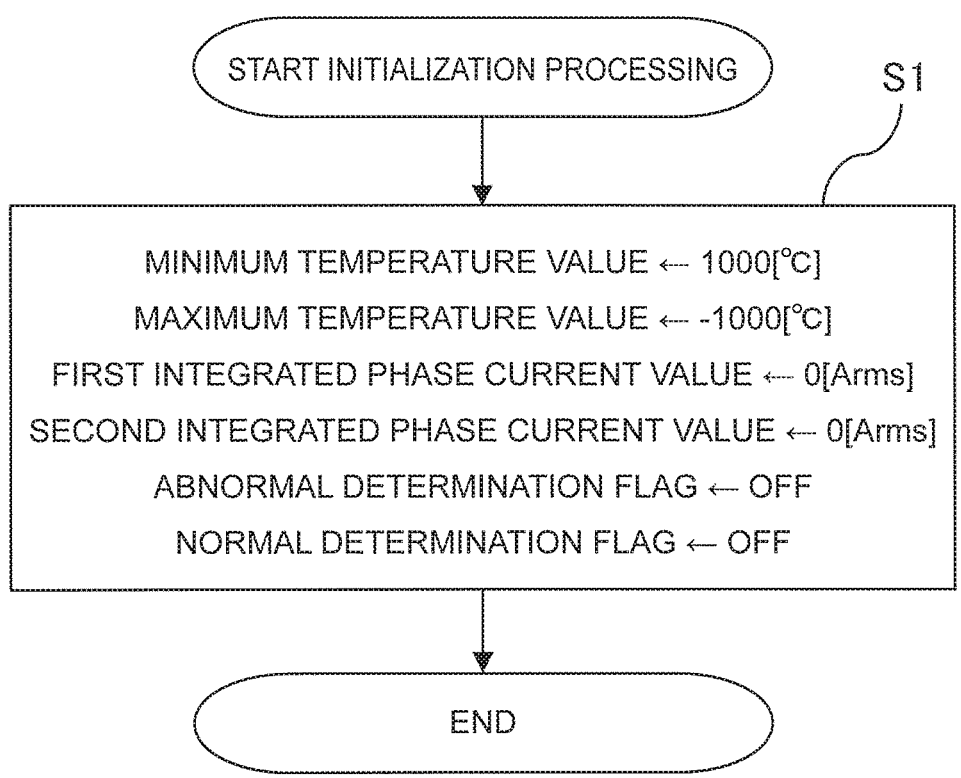
FIG. 3 is a flowchart showing a series of initialization processes executed by a temperature detection condition determination unit according to the first embodiment of this invention.

FIG. 3 is a flowchart showing a series of initialization processes executed by the temperature detection condition determination unit 72 according to the first embodiment of this invention. Note that the initialization processing shown in FIG. 3 is executed at a preset timing, for example.

Here, the temperature detection condition determination unit 72 executes the initialization processing shown in FIG. 3 to initialize variables used during temperature detection condition determination processing to be described below (referred to simply as "the variables" hereafter). The variables are constituted by a minimum temperature value, a maximum temperature value, a first integrated phase current value, a second integrated phase current value, an abnormal determination flag, and a normal determination flag, and are stored in the storage unit 73.

In step S1, the temperature detection condition determination unit 72 sets respective initial values of the minimum temperature value and the maximum temperature value included in the variables. Note that in the first embodiment, a case in which 1000 [° C.] is set as the initial value of the minimum temperature value and −1000 [° C.] is set as the initial value of the maximum temperature value will be described as an example.

Further, the temperature detection condition determination unit 72 sets respective initial values of the first integrated phase current value and the second integrated phase current value included in the variables at 0 [Arms]. The temperature detection condition determination unit 72 then sets respective initial values of the abnormal determination flag and the normal determination flag included in the variables to OFF. Once the processing of step S1 has been executed, the initialization processing is terminated.

Note that when the abnormal determination flag and the normal determination flag are both OFF, the temperature detection condition determination processing is incomplete.

Figure 4:
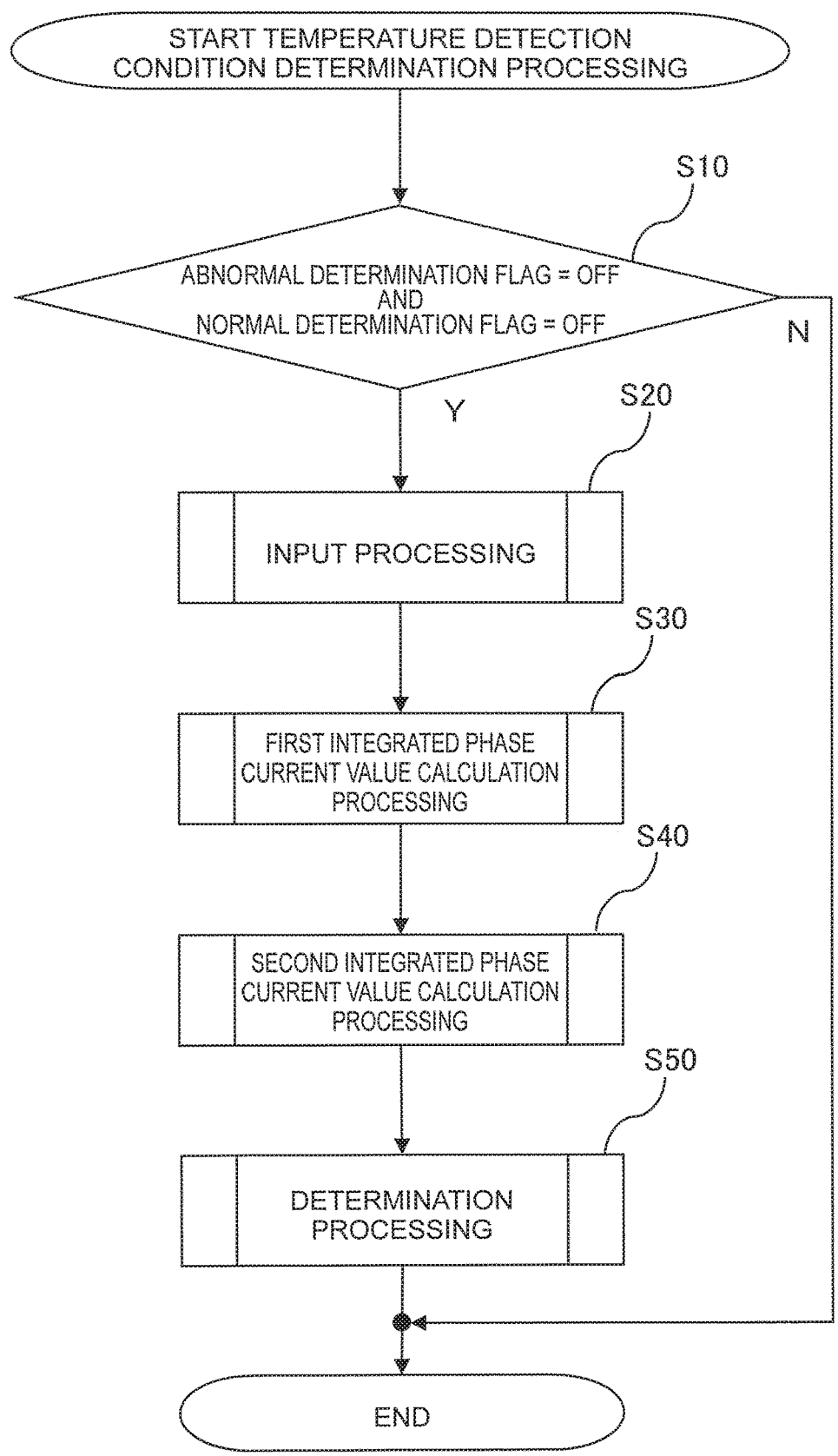
FIG. 4 is a flowchart showing a series of temperature detection condition determination processes executed by the temperature detection condition determination unit according to the first embodiment of this invention.

FIG. 4 is a flowchart showing a series of temperature detection condition determination processes executed by the temperature detection condition determination unit 72 according to the first embodiment of this invention. Note that the temperature detection condition determination processing shown in FIG. 4 is executed repeatedly at preset processing period intervals after executing the initialization processing shown in FIG. 3, for example.

In step S10, the temperature detection condition determination unit 72 determines whether or not the abnormal determination flag and the normal determination flag are both OFF. When it is determined that the abnormal determination flag and the normal determination flag are both OFF, the processing advances to step S20. When it is determined that the abnormal determination flag and the normal determination flag are not both OFF, on the other hand, the processing is terminated.

In step S20, the temperature detection condition determination unit 72 executes input processing shown on the flowchart in FIG. 5, to be described below, whereupon the processing advances to step S30.

Figure 6:
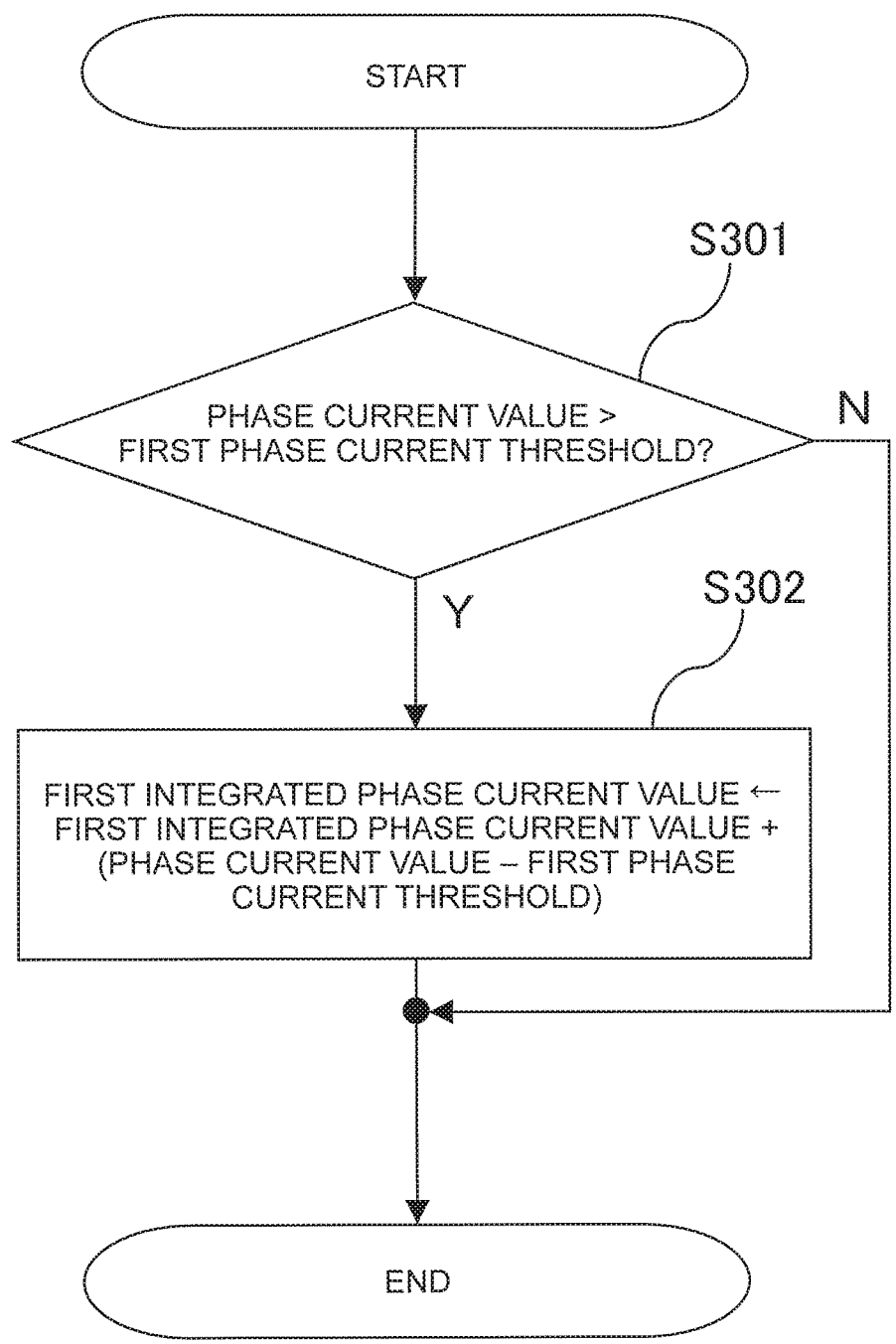
FIG. 6 is a flowchart showing a series of first integrated phase current value calculation processes executed by the temperature detection condition determination unit according to the first embodiment of this invention.

In step S30, the temperature detection condition determination unit 72 executes first integrated phase current value calculation processing shown on the flowchart in FIG. 6, to be described below, whereupon the processing advances to step S40.

Figure 7:
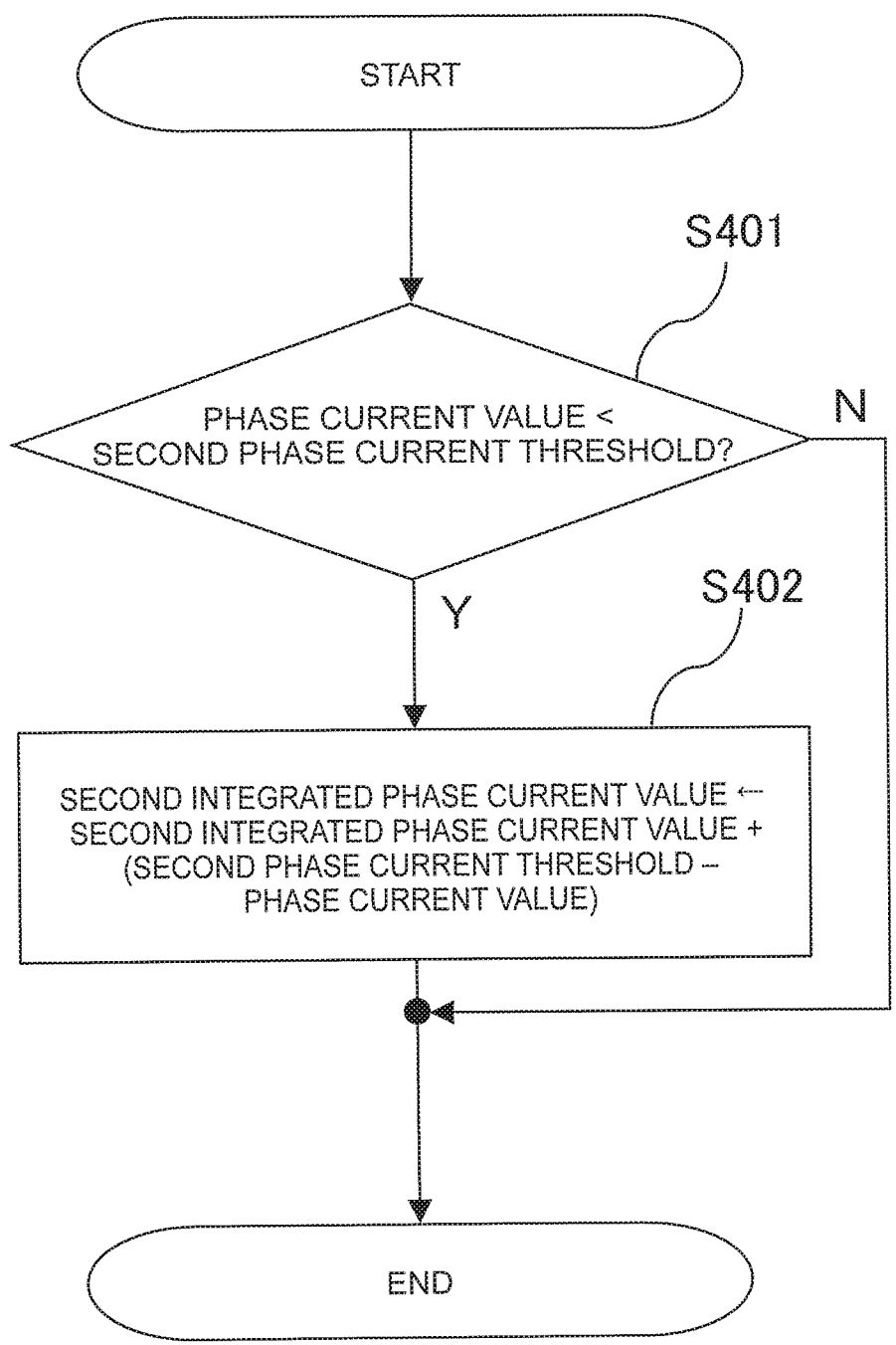
FIG. 7 is a flowchart showing a series of second integrated phase current value calculation processes executed by the temperature detection condition determination unit according to the first embodiment of this invention.

In step S40, the temperature detection condition determination unit 72 executes second integrated phase current value calculation processing shown on the flowchart in FIG. 7, to be described below, whereupon the processing advances to step S50.

Figure 8:
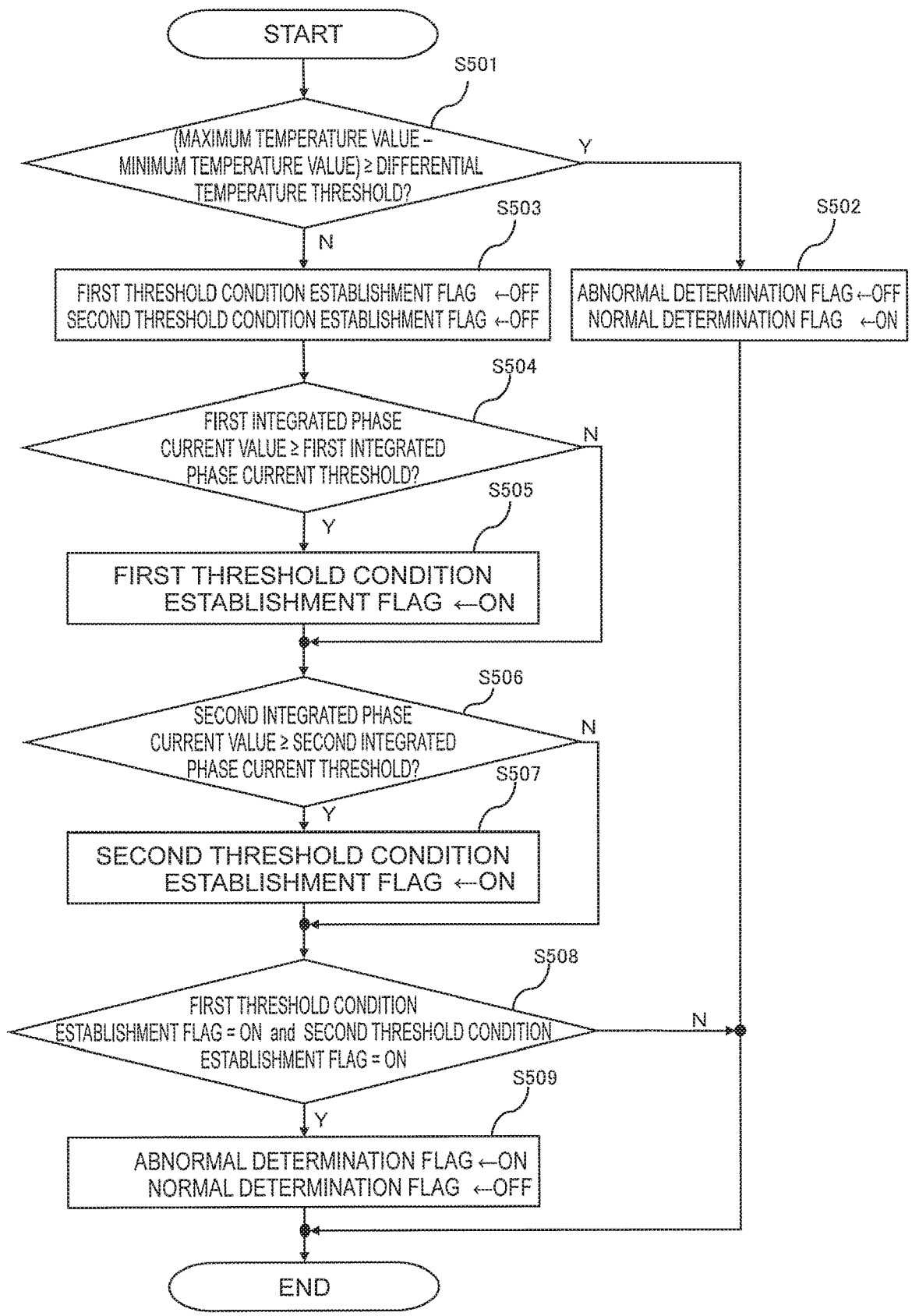
FIG. 8 is a flowchart showing a series of determination processes executed by the temperature detection condition determination unit according to the first embodiment of this invention.

In step S50, the temperature detection condition determination unit 72 executes determination processing shown on the flowchart in FIG. 8, to be described below, whereupon the processing is terminated.

Next, the input processing executed in step S20 of FIG. 4 will be described with reference to FIG. 5. FIG. 5 is a flowchart showing a series of input processes executed by the temperature detection condition determination unit 72 according to the first embodiment of this invention.

In step S201, the temperature detection condition determination unit 72 obtains a temperature detection value from the temperature detection unit to be subjected to the temperature detection condition determination, and stores the obtained temperature detection value in the storage unit 73. The processing then advances to step S202.

The first winding temperature sensor 34, the second winding temperature sensor 35, the U phase switching element temperature sensor 52U, the V phase switching element temperature sensor 52V, the W phase switching element temperature sensor 52W, the X phase switching element temperature sensor 52X, the Y phase switching element temperature sensor 52Y, the Z phase switching element temperature sensor 52Z, the battery temperature sensor 63, a substrate temperature sensor (not shown), a cooling water temperature sensor (not shown), or the like, for example, is set as the temperature detection unit to be subjected to the temperature detection condition determination. Note that means for estimating the temperature by implementing well-known estimation processing may be set as the temperature detection unit to be subjected to the temperature detection condition determination instead of a sensor that detects the temperature directly.

In step S202, the temperature detection condition determination unit 72 determines whether or not a current minimum temperature value is larger than the temperature detection value obtained in step S201. When the minimum temperature value is determined to be larger than the temperature detection value, the processing advances to step S203. When the minimum temperature value is determined to be equal to or smaller than the temperature detection value, on the other hand, the processing advances to step S204.

In step S203, the temperature detection condition determination unit 72 updates the current minimum temperature value to the temperature detection value obtained in step S201, and stores the updated minimum temperature value in the storage unit 73.

In step S204, a determination is made as to whether or not the current maximum temperature value is smaller than the temperature detection value obtained in step S201. When the maximum temperature value is determined to be smaller than the temperature detection value, the processing advances to step S205. When the maximum temperature value is determined to equal or exceed the temperature detection value, on the other hand, the processing advances to step S206.

In step S205, the temperature detection condition determination unit 72 updates the current maximum temperature value to the temperature detection value obtained in step S201, and stores the updated maximum temperature value in the storage unit 73.

Hence, by executing the series of processes of steps S201 to S205, the temperature detection condition determination unit 72 specifies the current maximum and minimum temperature values of the temperature detection value detected by the temperature detection unit following the start of the temperature detection condition determination.

In step S206, the temperature detection condition determination unit 72 calculates a phase current value from the detection value of each current sensor. More specifically, the temperature detection condition determination unit 72 converts the three-phase current constituted by the U phase current, the V phase current, and the W phase current detected respectively by the U phase current sensor 53U, the V phase current sensor 53V, and the W phase current sensor 53W into a d axis current $i_{d1}$ and a q axis current $i_{q1}$. Similarly, the temperature detection condition determination unit 72 converts the three-phase current constituted by the X phase current, the Y phase current, and the Z phase current detected respectively by the X phase current sensor 53X, the Y phase current sensor 53Y, and the Z phase current sensor 53Z into a d axis current $i_{d2}$ and a q axis current $i_{q2}$.

Next, the temperature detection condition determination unit 72 calculates a phase current value I in accordance with Equation (1), shown below, using the d axis current $i_{d1}$ and q axis current $i_{q1}$ relating to the first motor 31 and the d axis current $i_{d2}$ and q axis current $i_{q2}$ relating to the second motor 32. Note that here, a case in which an effective value of a phase current flowing through the motor device 3 is calculated as the phase current value flowing through the motor device 3 will be described.

$$I = \frac{\sqrt{i_{d1}^2 + i_{q1}^2}}{\sqrt{3}} + \frac{\sqrt{i_{d2}^2 + i_{q2}^2}}{\sqrt{3}} \quad (1)$$

Note that the temperature detection condition determination unit 72 may be configured to calculate the phase current value I in accordance with Equation (1) using the d axis current $i_{d1}$ and q axis current $i_{q1}$ generated by the control unit 71 in relation to the first motor 31, and the d axis current $i_{d2}$ and q axis current $i_{q2}$ generated by the control unit 71 in relation to the second motor 32.

The temperature detection condition determination unit 72 thus obtains the phase current value flowing through the motor device 3 of the motor system. More specifically, the temperature detection condition determination unit 72 calculates, and thereby obtains, the phase current value from the current values detected by the current detection units that detect the current values flowing through the respective phases of the motor device provided in the motor system.

In step S206, after obtaining the phase current value flowing through the motor device 3, the temperature detection condition determination unit 72 stores the phase current value in the storage unit 73, whereupon the processing is terminated.

Next, the first integrated phase current value calculation processing executed in step S30 of FIG. 4 will be described with reference to FIG. 6. FIG. 6 is a flowchart showing a series of first integrated phase current value calculation processes executed by the temperature detection condition determination unit 72 according to the first embodiment of this invention.

Figure 5:
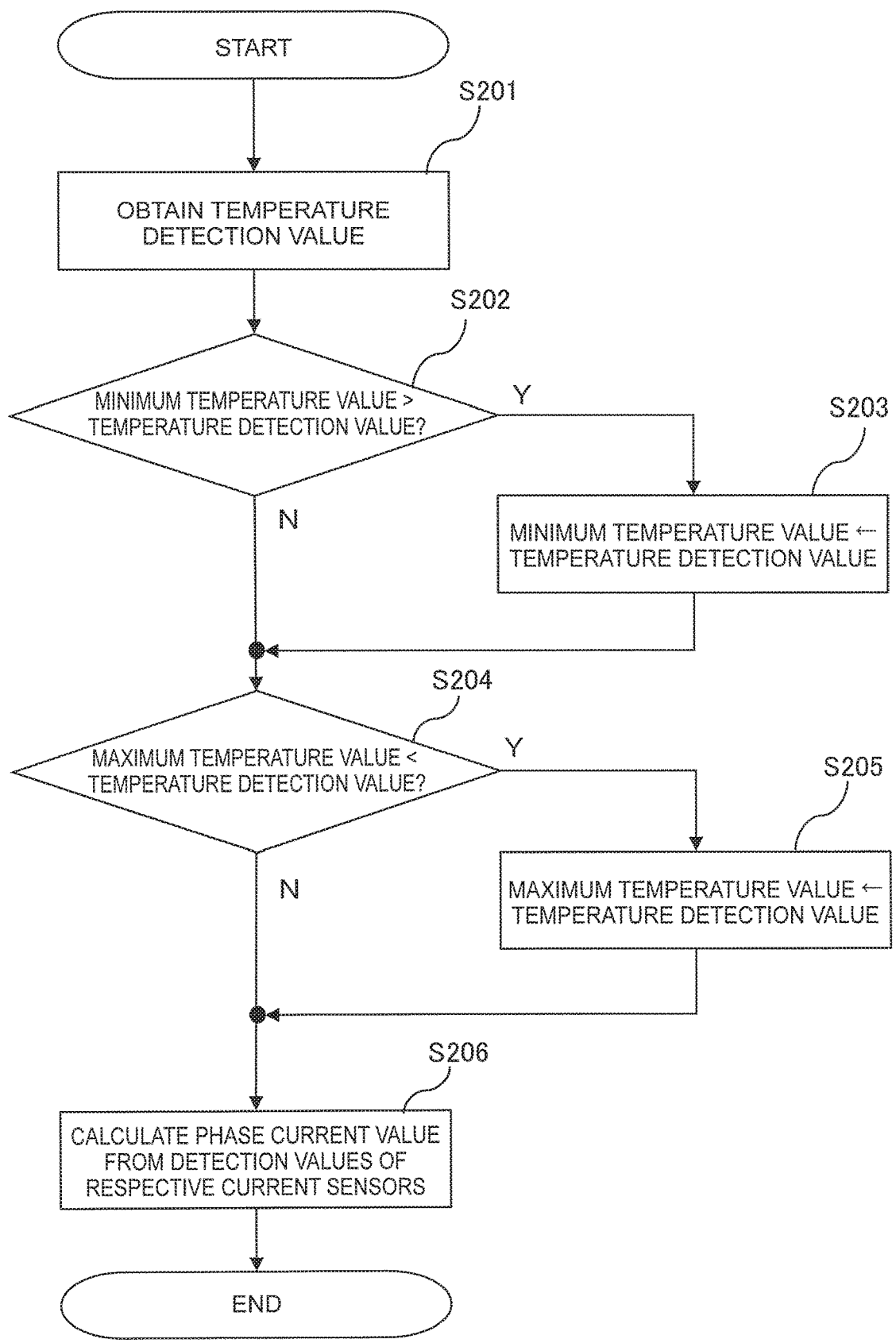
FIG. 5 is a flowchart showing a series of input processes executed by the temperature detection condition determination unit according to the first embodiment of this invention.

In step S301, the temperature detection condition determination unit 72 determines whether or not the phase current value calculated in step S206 of FIG. 5 exceeds a preset first phase current threshold. When the phase current value is determined to exceed the first phase current threshold, the processing advances to step S302. When the phase current value is determined to be equal to or smaller than the first phase current threshold, on the other hand, the processing is terminated.

In step S302, the temperature detection condition determination unit 72 integrates an amount by which the phase current value exceeds the first phase current threshold, or in other words a difference obtained by subtracting the first phase current threshold from the phase current value, into a current first integrated phase current value, and stores the integrated first integrated phase current value in the storage unit 73, whereupon the processing is terminated.

Next, the second integrated phase current value calculation processing executed in step S40 of FIG. 4 will be described with reference to FIG. 7. FIG. 7 is a flowchart showing a series of second integrated phase current value calculation processes executed by the temperature detection condition determination unit 72 according to the first embodiment of this invention.

In step S401, the temperature detection condition determination unit 72 determines whether or not the phase current value calculated in step S206 of FIG. 5 is smaller than a preset second phase current threshold. When the phase current value is determined to be smaller than the second phase current threshold, the processing advances to step S402. When the phase current value is determined to equal or exceed the second phase current threshold, on the other hand, the processing is terminated. Note that the second phase current threshold is smaller than the first phase current threshold.

In step S402, the temperature detection condition determination unit 72 integrates an amount by which the phase current value is smaller than the second phase current threshold, or in other words a difference obtained by subtracting the phase current value from the second phase current threshold, into a current second integrated phase current value, and stores the integrated second integrated phase current value in the storage unit 73, whereupon the processing is terminated.

Next, the determination processing executed in step S50 of FIG. 4 will be described with reference to FIG. 8. FIG. 8 is a flowchart showing a series of determination processes executed by the temperature detection condition determination unit 72 according to the first embodiment of this invention.

In step S501, the temperature detection condition determination unit 72 determines whether or not a differential temperature value obtained by subtracting the current minimum temperature value from the current maximum temperature value equals or exceeds a preset differential temperature threshold. When the differential temperature value is determined to equal or exceed the differential temperature threshold, the processing advances to step S502. When the differential temperature value is determined to be smaller than the differential temperature threshold, on the other hand, the processing advances to step S503.

Thus, the temperature detection condition determination unit 72 calculates the differential temperature value from the current maximum and minimum temperature values of the temperature detection value detected by the temperature detection unit following the start of the temperature detection condition determination.

In step S502, the temperature detection condition determination unit 72 sets the abnormal determination flag to OFF and sets the normal determination flag to ON, whereupon the processing is terminated. When the normal determination flag is ON, the temperature detection condition determination unit 72 determines that the temperature detection condition of the determination subject temperature detection unit is normal.

Hence, when the differential temperature value equals or exceeds the differential temperature threshold, the temperature detection condition determination unit 72 determines that the temperature detection condition is normal.

In step S503, the temperature detection condition determination unit 72 sets both a first threshold condition establishment flag and a second threshold condition establishment flag to OFF, whereupon the processing advances to step S504.

In step S504, the temperature detection condition determination unit 72 determines whether or not the current first integrated phase current value equals or exceeds a preset first integrated phase current threshold. When the first integrated phase current value is determined to equal or exceed the first integrated phase current threshold, the processing advances to step S505. When the first integrated phase current value is determined to be smaller than the first integrated phase current threshold, on the other hand, the processing advances to step S506.

In step S505, the temperature detection condition determination unit 72 sets the first threshold condition establishment flag to ON, whereupon the processing advances to step S506.

In step S506, the temperature detection condition determination unit 72 determines whether or not the current second integrated phase current value equals or exceeds a preset second integrated phase current threshold. When the second integrated phase current value is determined to equal or exceed the second integrated phase current threshold, the processing advances to step S507. When the second integrated phase current value is determined to be smaller than the second integrated phase current threshold, on the other hand, the processing advances to step S508.

In step S507, the temperature detection condition determination unit 72 sets the second threshold condition establishment flag to ON, whereupon the processing advances to step S508.

In step S508, the temperature detection condition determination unit 72 determines whether or not the first threshold condition establishment flag and the second threshold condition establishment flag are both ON. When the first threshold condition establishment flag and the second threshold condition establishment flag are both determined to be ON, the processing advances to step S509. When the first threshold condition establishment flag and the second threshold condition establishment flag are not both determined to be ON, on the other hand, the processing is terminated.

In step S509, the abnormal determination flag is set to ON and the normal determination flag is set to OFF, whereupon the processing is terminated. When the abnormal determination flag is ON, the temperature detection condition determination unit 72 determines that the temperature detection condition of the determination subject temperature detection unit is abnormal.

Hence, when the differential temperature value is smaller than the differential temperature threshold, the first integrated phase current value equals or exceeds the first integrated phase current threshold, and the second integrated phase current value equals or exceeds the second integrated phase current threshold, the temperature detection condition determination unit 72 determines that the temperature detection condition is abnormal.

Figure 9:
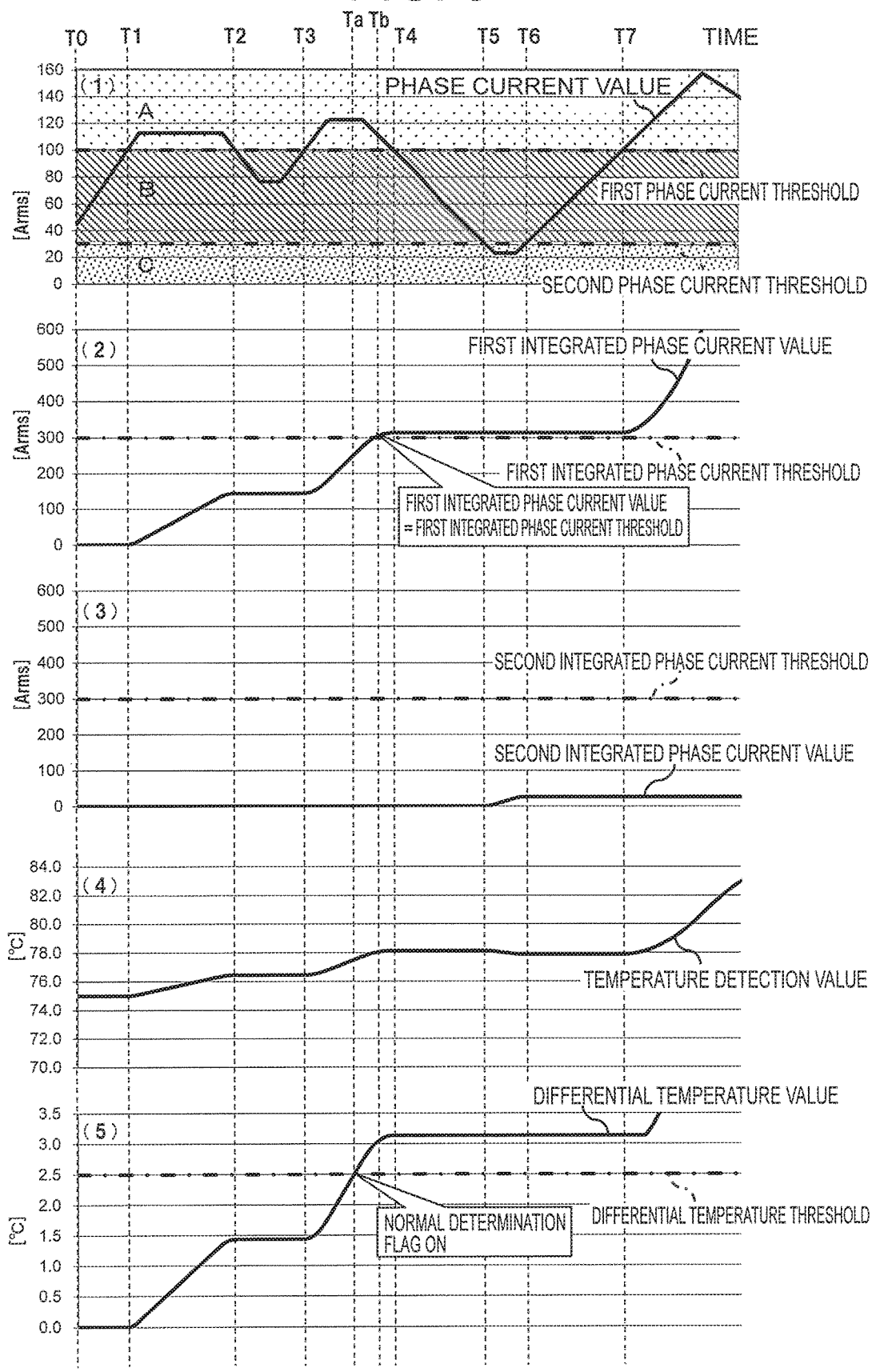
FIG. 9 is a timing chart showing a first example operation of the temperature detection condition determination unit according to the first embodiment of this invention.
Figure 10:
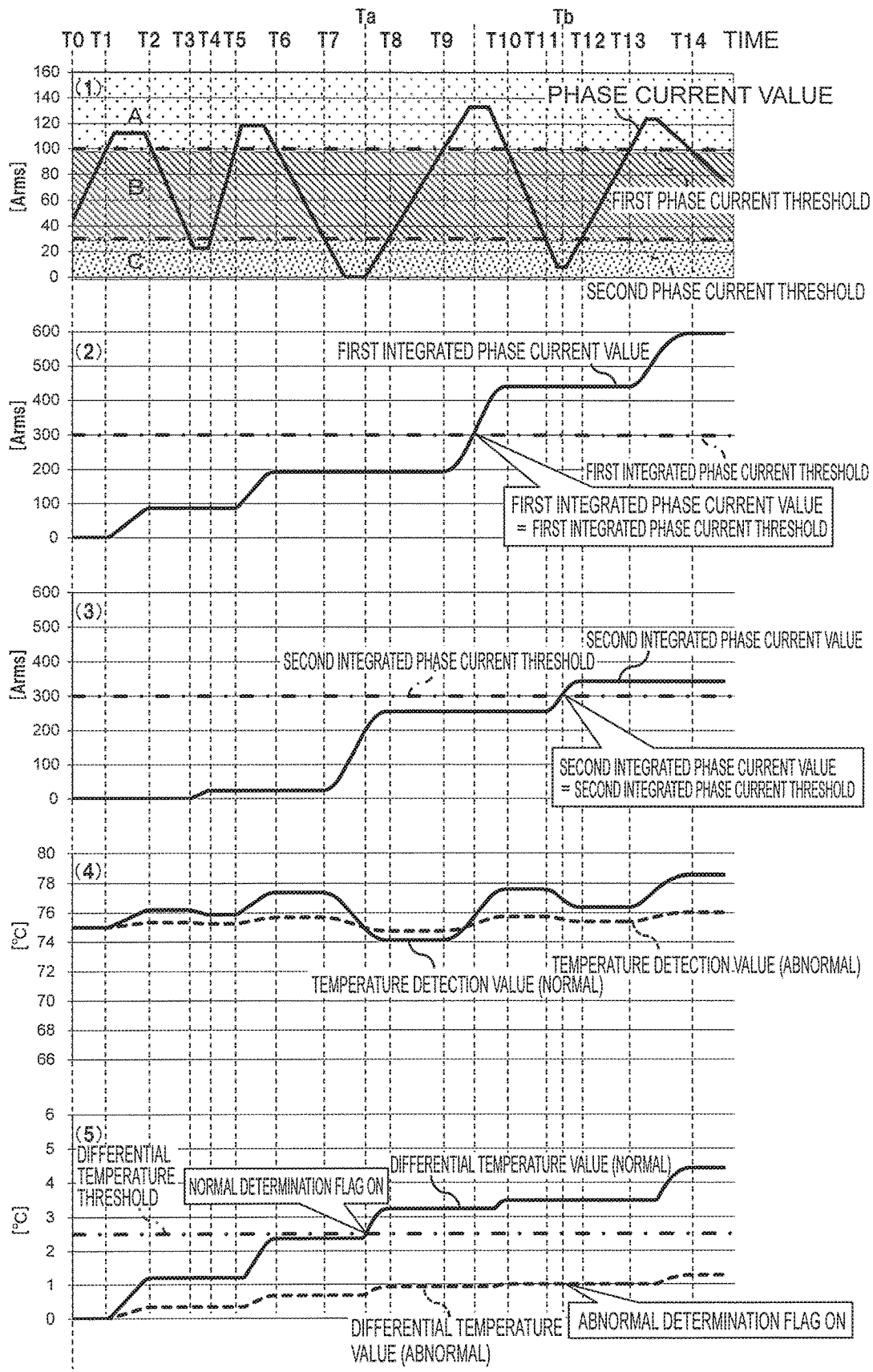
FIG. 10 is a timing chart showing a second example operation of the temperature detection condition determination unit according to the first embodiment of this invention.
Figure 11:
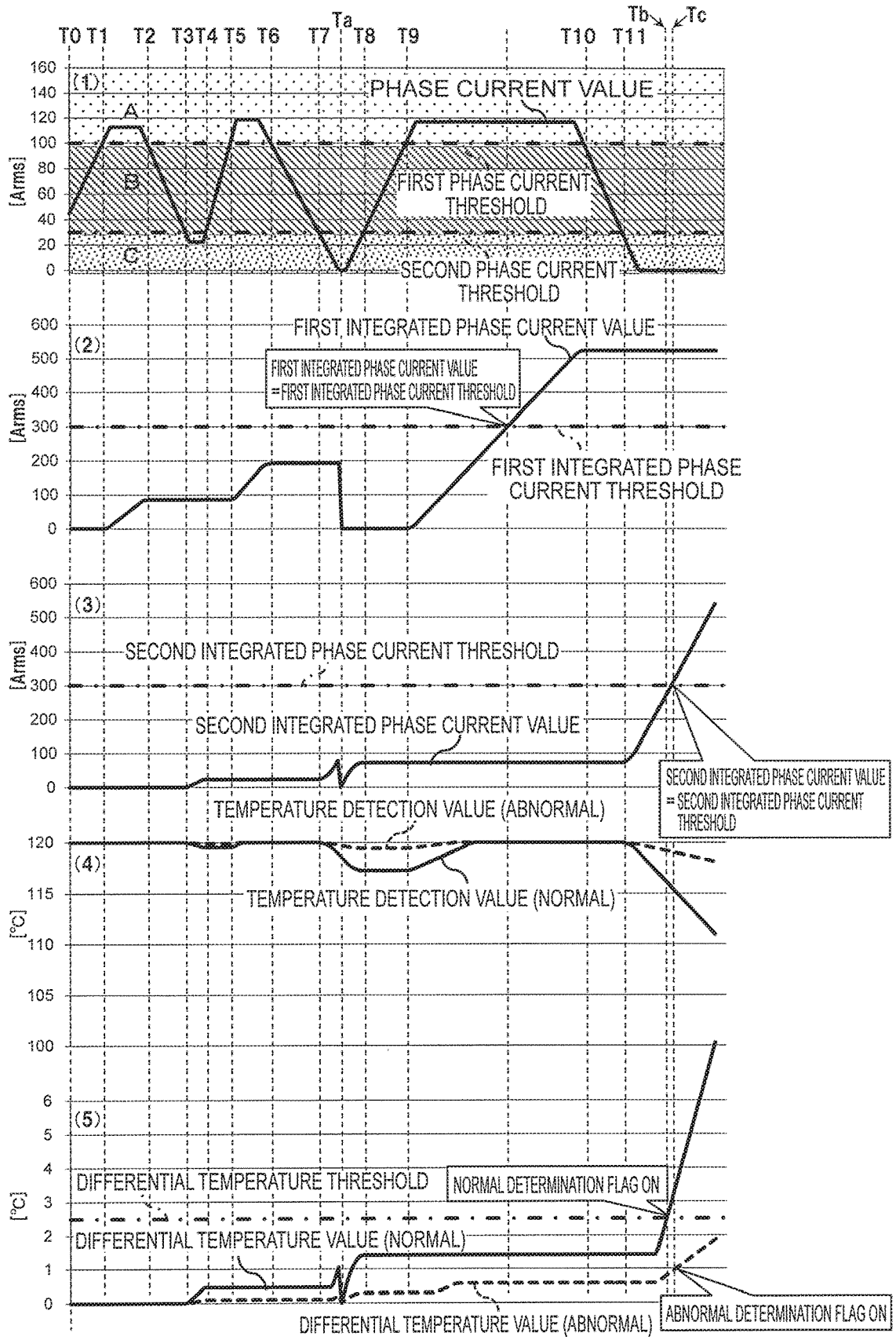
FIG. 11 is a timing chart showing a third example operation of the temperature detection condition determination unit according to the first embodiment of this invention.

Next, example operations of the temperature detection condition determination unit 72 will be described with reference to FIGS. 9 to 11. FIG. 9 is a timing chart showing a first example operation of the temperature detection condition determination unit 72 according to the first embodiment of this invention. FIG. 10 is a timing chart showing a second example operation of the temperature detection condition determination unit 72 according to the first embodiment of this invention. FIG. 11 is a timing chart showing a third example operation of the temperature detection condition determination unit 72 according to the first embodiment of this invention.

Note that in FIGS. 9 to 11, chart (1) shows an example of temporal variation in the phase current value [Arms], calculated by the temperature detection condition determination unit 72, alongside the first phase current threshold and the second phase current threshold. Chart (1) also shows a region A in which the phase current value equals or exceeds the first phase current threshold, a region B in which the phase current value is no smaller than the second phase current threshold and no larger than the first phase current threshold, and a region C in which the phase current value is equal to or smaller than the second phase current threshold.

Further, chart (2) shows temporal variation in the first integrated phase current value [Arms], calculated by the temperature detection condition determination unit 72, alongside the first integrated phase current threshold in a case where the phase current value undergoes temporal variation in accordance with chart (1).

Chart (3) shows temporal variation in the second integrated phase current value [Arms], calculated by the temperature detection condition determination unit 72, alongside the second integrated phase current threshold in a case where the phase current value undergoes temporal variation in accordance with chart (1).

Furthermore, chart (4) shows a solid line denoting an example of temporal variation in the temperature detection value [° C.] detected by the determination subject temperature detection unit when normal in a case where the phase current value undergoes temporal variation in accordance with chart (1), and a dotted line denoting an example of temporal variation in the temperature detection value [° C.] detected by the determination subject temperature detection unit when abnormal in a case where the phase current value undergoes temporal variation in accordance with chart (1).

Further, chart (5) shows, alongside the differential temperature threshold, a solid line denoting the differential temperature value [° C.] calculated by the temperature detection condition determination unit 72 in a case where the temperature detection value undergoes temporal variation in accordance with the solid line on chart (4), and a dotted line denoting the differential temperature value [° C.] calculated by the temperature detection condition determination unit 72 in a case where the temperature detection value undergoes temporal variation in accordance with the dotted line on chart (4).

Note that for convenience, FIGS. 9 to 11 show temporal variation in the first integrated phase current value, the second integrated phase current value, and the differential temperature value on the assumption that the temperature detection condition determination unit 72 continues to implement the calculation processing even after the normal determination flag is set to ON. As is evident from step S10 of FIG. 4, however, in the actual configuration, these values are not calculated when the normal determination flag is set at ON.

Similarly, for convenience, FIGS. 10 and 11 show temporal variation in the first integrated phase current value, the second integrated phase current value, and the differential temperature value on the assumption that the temperature detection condition determination unit 72 continues to implement the calculation processing even after the abnormal determination flag is set to ON. As is evident from step S10 of FIG. 4, however, in the actual configuration, these values are not calculated when the abnormal determination flag is set at ON.

First, the first example operation shown in FIG. 9 will be described. As the first example operation, FIG. 9 shows an operation in which the temperature detection condition of the determination subject temperature detection unit is normal such that the temperature detection condition determination unit 72 determines that the temperature detection condition is normal.

Note that in the first example operation, it is assumed that the initialization processing shown in FIG. 3 is executed at T0, whereupon the temperature detection condition determination processing shown in FIG. 4 is executed repeatedly at preset processing period intervals.

In FIG. 9, as shown on chart (1), the phase current value exists in region A within a zone extending from T1 to T2, a zone extending from T3 to T4, and from T7 onward. When the temperature detection condition of the temperature detection unit is normal, the temperature detection value is expected to increase, as shown on chart (4), in the time zones where the phase current value exists in region A due to the effect of the phase current value that equals or exceeds the first phase current threshold. As shown on chart (2), therefore, in the time zones where the phase current value exists in region A, the amount by which the phase current value exceeds the first phase current threshold is integrated into the first integrated phase current value.

As shown on chart (1), the phase current value exists in region C within a zone extending from T5 to T6. When the temperature detection condition of the temperature detection unit is normal, cooling water has a greater effect than the phase current value that does not exceed the second phase current threshold, and therefore the temperature detection value is expected to decrease, as shown on chart (4), in the time zone where the phase current value exists in region C. As shown on chart (3), therefore, in the time zone where the phase current value exists in region C, the amount by which the phase current value is smaller than the second phase current threshold is integrated into the second integrated phase current value.

As shown on chart (1), the phase current value exists in region B within a zone extending from T0 to T1, a zone extending from T2 to T3, a zone extending from T4 to T5, and a zone extending from T6 to T7. In the time zones where the phase current value exists in region B, the temperature increase caused by the phase current value and the temperature reduction caused by the cooling water are substantially balanced, and therefore the temperature detection value is expected to remain substantially constant, as shown on chart (4). Accordingly, the integration processing described above is not implemented on the first integrated phase current value and the second integrated phase current value.

In FIG. 9, the differential temperature value, which is calculated from the maximum and minimum temperature values of the temperature detection value detected by the temperature detection unit following the start time T0 of the temperature detection condition determination, reaches the differential temperature threshold at a time Ta.

In other words, the differential temperature value reaches the differential temperature threshold at Ta, which is earlier than a time Tb at which the first integrated phase current value reaches or exceeds the first integrated phase current threshold. As a result, the normal determination flag is set to ON, and the temperature detection condition of the temperature detection unit is determined to be normal.

Next, the second example operation shown in FIG. 10 will be described. As the second example operation, FIG. 10 shows both an operation in which the temperature detection condition of the determination subject temperature detection unit is normal such that the temperature detection condition determination unit 72 determines that the temperature detection condition is normal, and an operation in which the temperature detection condition of the determination subject temperature detection unit is abnormal such that the temperature detection condition determination unit 72 determines that the temperature detection condition is abnormal.

Note that in the second example operation, it is assumed that the initialization processing shown in FIG. 3 is executed at T0, whereupon the temperature detection condition determination processing shown in FIG. 4 is executed repeatedly at preset processing period intervals.

In FIG. 10, as shown on chart (1), the phase current value exists in region A within a zone extending from T1 to T2, a zone extending from T5 to T6, a zone extending from T9 to T10, and a zone extending from T13 to T14. Similarly to the operation described above, in the time zones where the phase current value exists in region A, the amount by which the phase current value exceeds the first phase current threshold is integrated into the first integrated phase current value.

As shown on chart (1), the phase current value exists in region C within a zone extending from T3 to T4, a zone extending from T7 to T8, and a zone extending from T11 to T12. Similarly to the operation described above, in the time zones where the phase current value exists in region C, the amount by which the phase current value is smaller than the second phase current threshold is integrated into the second integrated phase current value.

As shown on chart (1), the phase current value exists in region B within a zone extending from T0 to T1, a zone extending from T2 to T3, a zone extending from T4 to T5, a zone extending from T6 to T7, a zone extending from T8 to T9, a zone extending from T0 to T11, a zone extending from T12 to T13, and from T14 onward. Similarly to the operation described above, in the time zones where the phase current value exists in region B, the integration processing described above is not implemented on the first integrated phase current value and the second integrated phase current value.

In FIG. 10, when the temperature detection condition of the temperature detection unit is normal, the differential temperature value reaches the differential temperature threshold at Ta, which is earlier than a time Tb at which the first integrated phase current value reaches or exceeds the first integrated phase current threshold and the second integrated phase current value reaches or exceeds the second integrated phase current threshold. As a result, the normal determination flag is set to ON, and the temperature detection condition of the temperature detection unit is determined to be normal.

When the temperature detection condition of the temperature detection unit is abnormal, on the other hand, the first integrated phase current value reaches or exceeds the first integrated phase current threshold and the second integrated phase current value reaches or exceeds the second integrated phase current threshold at Tb, but the differential temperature value does not reach the differential temperature threshold. As a result, the abnormal determination flag is set to ON, and the temperature detection condition of the temperature detection unit is determined to be abnormal.

Next, the third example operation shown in FIG. 11 will be described. As the third example operation, FIG. 11 shows both an operation in which the temperature detection condition of the determination subject temperature detection unit is normal such that the temperature detection condition determination unit 72 determines that the temperature detection condition is normal, and an operation in which the temperature detection condition of the determination subject temperature detection unit is abnormal such that the temperature detection condition determination unit 72 determines that the temperature detection condition is abnormal.

Note that in the third example operation, it is assumed that the initialization processing shown in FIG. 3 is executed at T0, whereupon the temperature detection condition determination processing shown in FIG. 4 is executed repeatedly at preset processing period intervals in a zone extending from T0 to Ta. It is also assumed that the vehicle continues to perform a high load operation after the temperature detection value reaches substantial saturation at 120° C., and at Ta, a power supply of the vehicle is switched OFF and then switched ON again. In this case, the control device 7 is reset at Ta, and therefore the initialization processing shown in FIG. 3 is executed. Then, from Ta onward, the temperature detection condition determination processing shown in FIG. 4 is executed repeatedly at preset processing period intervals.

In FIG. 11, as shown on chart (1), the phase current value exists in region A within a zone extending from T1 to T2, a zone extending from T5 to T6, and a zone extending from T9 to T10. Similarly to the operation described above, in the time zones where the phase current value exists in region A, the amount by which the phase current value exceeds the first phase current threshold is integrated into the first integrated phase current value.

As shown on chart (1), the phase current value exists in region C within a zone extending from T3 to T4, a zone extending from T7 to T8, and from T11 onward. Similarly to the operation described above, in the time zones where the phase current value exists in region C, the amount by which the phase current value is smaller than the second phase current threshold is integrated into the second integrated phase current value.

As shown on chart (1), the phase current value exists in region B within a zone extending from T0 to T1, a zone extending from T2 to T3, a zone extending from T4 to T5, a zone extending from T6 to T7, a zone extending from T8 to T9, and a zone extending from T10 to T11. Similarly to the operation described above, in the time zones where the phase current value exists in region B, the integration processing described above is not implemented on the first integrated phase current value and the second integrated phase current value.

In FIG. 11, when the temperature detection condition of the temperature detection unit is normal, the differential temperature value reaches the differential temperature threshold at Tb, which is earlier than a time Tc at which the first integrated phase current value reaches or exceeds the first integrated phase current threshold and the second integrated phase current value reaches or exceeds the second integrated phase current threshold. As a result, the normal determination flag is set to ON, and the temperature detection condition of the temperature detection unit is determined to be normal.

When the temperature detection condition of the temperature detection unit is abnormal, on the other hand, the first integrated phase current value reaches or exceeds the first integrated phase current threshold and the second integrated phase current value reaches or exceeds the second integrated phase current threshold at Tc, but the differential temperature value does not reach the differential temperature threshold. As a result, the abnormal determination flag is set to ON, and the temperature detection condition of the temperature detection unit is determined to be abnormal.

When temperature saturation occurs as described above, and the vehicle continues to perform a high load operation, the differential temperature value does not reach or exceed the differential temperature threshold. Even when the vehicle continues to perform a high load operation, however, the first integrated phase current value eventually equals or exceeds the first integrated phase current threshold and the second integrated phase current value eventually equals or exceeds the second integrated phase current threshold.

In the first embodiment, erroneous determination of the temperature detection condition of the temperature detection unit is avoided by implementing the determination as to whether or not the first integrated phase current value equals or exceeds the first integrated phase current threshold separately to the determination as to whether or not the second integrated phase current value equals or exceeds the second integrated phase current threshold.

Note that the first phase current threshold, second phase current threshold, first integrated phase current threshold, second integrated phase current threshold, and differential temperature threshold shown in FIGS. 9 to 11 are design values that can be adjusted as appropriate, and are set at appropriate values obtained through simulations, experiments, and the like so that the temperature detection condition of the determination subject temperature detection unit is determined with a favorable degree of precision.

Note that in the first embodiment, three regions A, B, and C separated by two thresholds of different magnitudes are set as the regions in which the phase current value exists in consideration of the fact that the temperature detection value may, depending on the region in which the phase current value exists, remain substantially constant. In another embodiment, however, two regions divided by a single threshold may be set as the regions in which the phase current value exists. In other words, the first phase current threshold and the second phase current threshold may be set at identical values. In this case, the amount by which the phase current value exceeds the threshold is integrated into the first integrated phase current value, and the amount by which the phase current value is smaller than the threshold is integrated into the second integrated phase current value.

Figure 12:
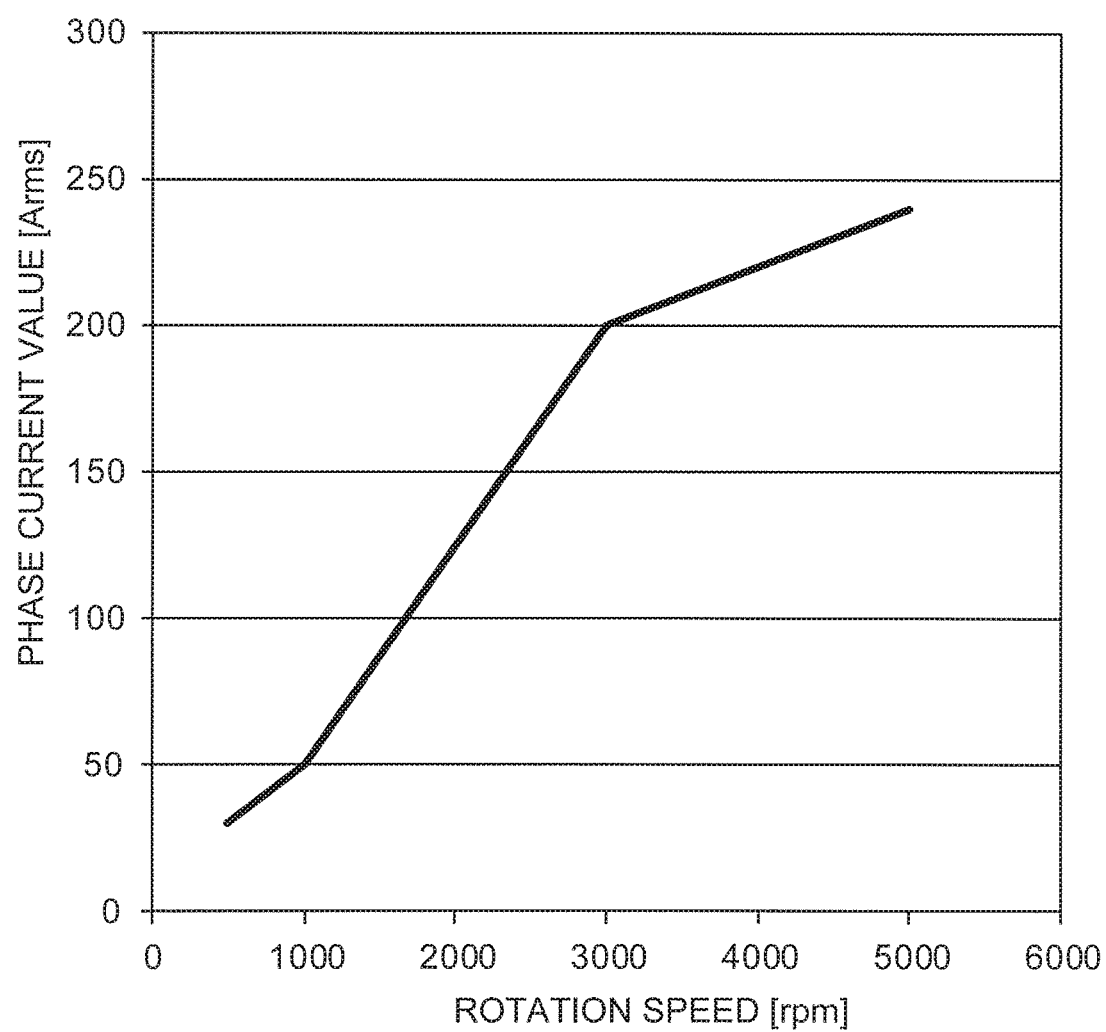
FIG. 12 is a graph showing an example of a relationship between a phase current value flowing through a motor device and a rotation speed of the motor device in a case where a torque command input into the control device according to the first embodiment of this invention is zero.

Next, a phase current value that is passed through the motor device 3 in order to suppress an induced voltage in a case where the torque command is zero will be described with reference to FIG. 12. FIG. 12 is a graph showing an example of a relationship between the phase current value flowing through the motor device 3 and a rotation speed of the motor device 3 in a case where the torque command input into the control device 7 according to the first embodiment of this invention is zero.

As shown in FIG. 12, when the torque command is zero, a phase current value corresponding to the rotation speed is passed through the motor device 3 to ensure that an actual torque matches zero, in accordance with the torque value, at each rotation speed. In other words, a phase current value continues to flow even when the torque command remains at zero.

As a result, the temperature detection condition determination unit 72, which is configured to implement the temperature detection condition determination processing using the phase current value, can determine the temperature detection condition of the temperature detection unit used in the motor system even when the torque command remains at zero.

In the example described in the first embodiment, the first integrated phase current value obtained by integrating the amount by which the phase current value exceeds the first phase current threshold and the second integrated phase current value obtained by integrating the amount by which the phase current value is smaller than the second phase current threshold are both calculated as the integrated phase current value. According to this configuration, the temperature detection condition is determined by determining the amount of variation in the temperature detection value detected by the temperature detection unit following the start of the temperature detection condition determination and the amount of variation in the first and second integrated phase current values calculated as the integrated phase current value.

Further, in the above configuration, a case in which the amount of variation in the differential temperature value is determined, the differential temperature value being calculated from the current maximum and minimum temperature values of the temperature detection value detected by the temperature detection unit following the start of the temperature detection condition determination, was described as a specific example of determining the amount of variation in the temperature detection value detected by the temperature detection unit following the start of the temperature detection condition determination. Furthermore, a case in which a determination is made as to whether or not the differential temperature value equals or exceeds the differential temperature threshold was described as a specific example of determining the amount of variation in the differential temperature value. Note that a configuration in which an amount of variation in a characteristic value other than the differential temperature value is determined may be employed as a configuration for determining the amount of variation in the temperature detection value.

Further, in the above configuration, a case in which determinations are made as to whether or not the first integrated phase current value equals or exceeds the first integrated phase current threshold and whether or not the second integrated phase current value equals or exceeds the second integrated phase current threshold was described as a specific example of determining the amounts of variation in the first integrated phase current value and the second integrated phase current value.

This invention is not limited to the above configuration, however, and either one of the first integrated phase current value and the second integrated phase current value may be calculated as the integrated phase current value. According to this configuration, the temperature detection condition is determined by determining the amount of variation in the temperature detection value detected by the temperature detection unit following the start of the temperature detection condition determination, and the amount of variation in either the first integrated phase current value or the second integrated phase current value calculated as the integrated phase current value. For example, when the first integrated phase current value is used as the integrated phase current value, a determination as to whether or not the first integrated phase current value equals or exceeds the first integrated phase current threshold is made as a specific example of determining the amount of variation in the first integrated phase current value.

According to the first embodiment, described above, the phase current value flowing through the motor device of the motor system is obtained, the temperature detection value detected by the temperature detection unit is obtained, and at least one of the first integrated phase current value, which is obtained by integrating the amount by which the phase current value exceeds the first phase current threshold, and the second integrated phase current value, which is obtained by integrating the amount by which the phase current value is smaller than the second phase current threshold, the second phase current threshold being equal to or smaller than the first phase current threshold, is calculated as the integrated phase current value.

Further, in the above configuration, the temperature detection condition of the temperature detection unit is determined by determining the amount of variation in the temperature detection value detected by the temperature detection unit following the start of the temperature detection condition determination, and the amount of variation in the calculated integrated phase current value.

Hence, the temperature detection condition of the temperature detection unit used in the motor system can be determined regardless of the operating condition of the vehicle. As a result, the accuracy of the temperature detection value detected by the temperature detection unit can be determined, and the motor system can be protected appropriately.

Further, the temperature detection condition of the temperature detection unit used in the motor system can be determined even when the torque command remains at zero, for example.

More specifically, even when, for example, the vehicle travels without assistance from the motor, or in other words travels at high speed using the engine alone such that the torque command is zero, a phase current is passed through the motor device in order to suppress an induced voltage, and therefore the temperature detection condition of the temperature detection unit can be determined. Moreover, even when, for example, the vehicle travels uphill without assistance from the motor, or in other words travels uphill at a high rotation speed using the engine alone such that the torque command is zero, a phase current is passed through the motor device in order to suppress an induced voltage, and therefore the temperature detection condition of the temperature detection unit can be determined.

Second Embodiment

In a second embodiment of this invention, a case in which the phase current value is calculated using a different calculation method to the first embodiment during the input processing will be described. Note that parts of the second embodiment that are similar to the first embodiment will not be described, and the following description will focus on differences to the first embodiment.

Figure 13:
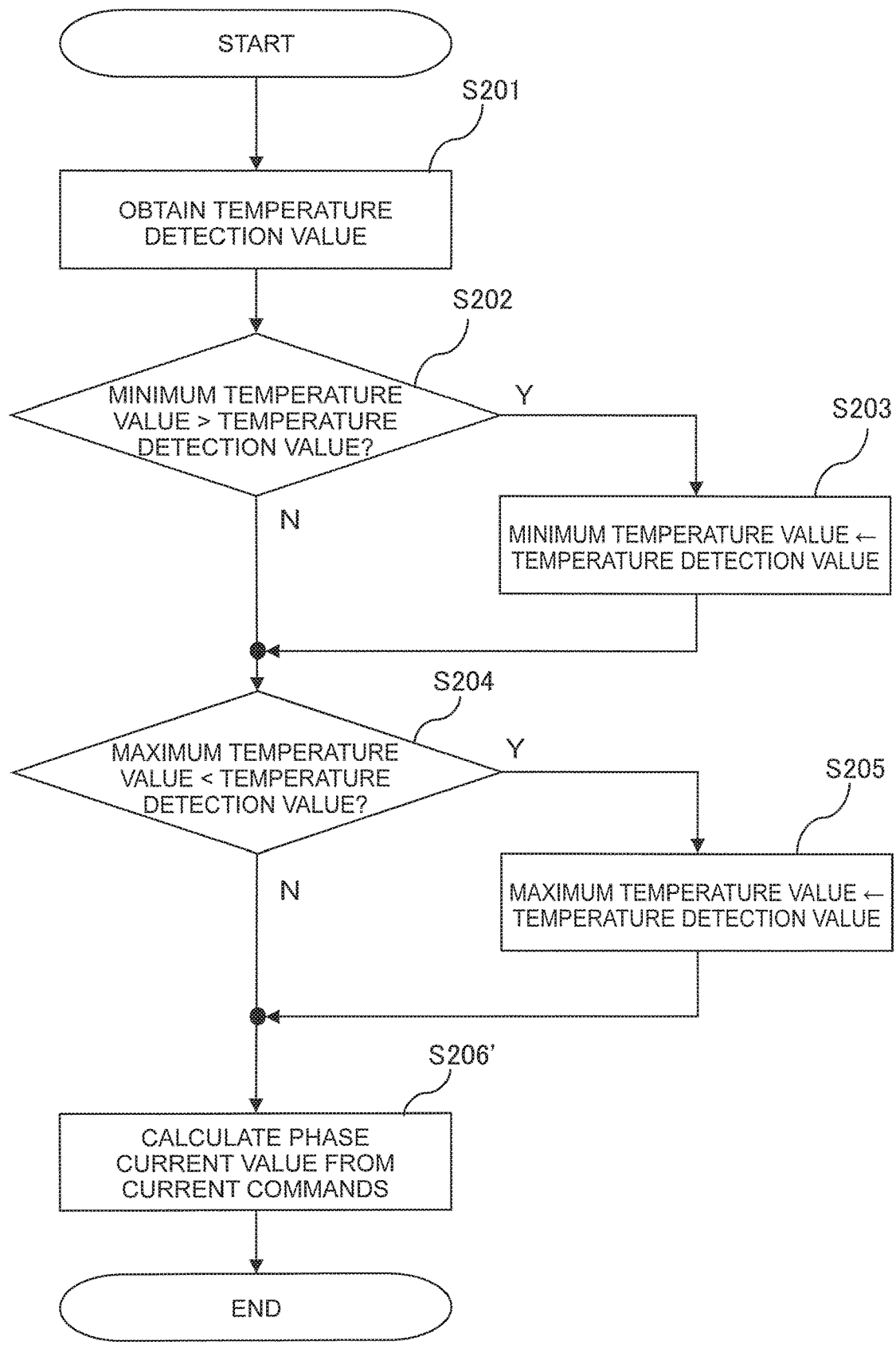
FIG. 13 is a flowchart showing a series of input processes executed by a temperature detection condition determination unit according to a second embodiment of this invention.

FIG. 13 is a flowchart showing a series of input processes executed by the temperature detection condition determination unit 72 according to the second embodiment of this invention. Note that processing executed in steps S201 to S205 of FIG. 13 is identical to that of steps S201 to S205 of FIG. 5.

In step S206', the temperature detection condition determination unit 72 calculates the phase current value from the current commands generated by the control unit 71. More specifically, the temperature detection condition determination unit 72 calculates the phase current value I in accordance with Equation (1) from the d axis and q axis current commands $i_{d1}$, $i_{q1}$ generated by the control unit 71 in relation to the first motor 31, and the d axis and q axis current commands $i_{d2}$, $i_{q2}$ generated by the control unit 71 in relation to the second motor 32.

Hence, the phase current value can be calculated in a similar manner to the first embodiment using the respective current commands generated by the control unit 71 instead of the respective d axis and q axis currents of the first motor 31 and the second motor 32.

According to the second embodiment, described above, the phase current value is calculated, and thereby obtained, from the current commands used to control the motor device instead of the detection values obtained by the current detection units that detect the current values flowing through the respective phases of the motor device, as in the first embodiment. Likewise with this configuration, similar effects to the first embodiment are obtained.

What is claimed is:

1. A control device for a motor system, the control device comprising:
    a memory; and
    a processor configured to:
        control the motor system; and
        perform a function for detecting a temperature sensor sticking abnormality, the function for detecting the temperature sensor sticking abnormality comprising:
            obtaining a phase current value flowing through a motor device of the motor system and obtaining a temperature detection value detected by the temperature sensor used in the motor system;
            accumulating, in the memory, as a first integrated phase current value, value, an amount by which the obtained phase current value exceeds a first phase current threshold, and accumulating, in the memory, as a second integrated phase current value, an amount by which the phase current value is smaller than a second phase current threshold that is smaller than the first phase current threshold;
            calculating, as a differential temperature value, a difference between a maximum temperature value and a minimum temperature value obtained from detected temperature detection values from a start of determination of temperature detection condition up to a present time; and
            based on the first integrated phase current value reaching or exceeding a first integrated phase current threshold and the second integrated phase current value reaching or exceeding a second integrated phase current threshold, while the differential temperature value does not reach or exceed a differential temperature threshold, detecting the temperature sensor sticking abnormality.

2. The control device for the motor system according to claim 1, wherein the differential temperature value is a difference between a current maximum temperature value and a current minimum temperature value of the temperature detection values detected by the temperature sensor.

3. The control device for the motor system according to claim 2, wherein the processor is further configured to determine that a temperature detection condition is normal when the differential temperature value equals or exceeds the differential temperature threshold, while the first integrated phase current value has not reached or exceeded the first integrated phase current threshold and the second integrated phase current value has not reached or exceeded the second integrated phase current threshold.

4. The control device for the motor system according to claim 1, wherein
    the motor system is provided with a current detection sensor that detects current values flowing through respective phases of the motor device, and
    the processor is further configured to calculate, and thereby obtain, the phase current value from the current values detected by the current detection sensor.

5. The control device for the motor system according to claim 1, wherein the processor is further configured to generate a current command for controlling the motor device, and calculate, and thereby obtain, the phase current value from the generated current command.

6. A temperature detection condition determination method for a motor system, the temperature detection condition determination method comprising:
    controlling the motor system; and
    performing a function for detecting a temperature sensor sticking abnormality, the function for detecting the temperature sensor sticking abnormality comprising:
        obtaining a phase current value flowing through a motor device of the motor system and obtaining a temperature detection value detected by the temperature sensor used in the motor system;
        accumulating, in a memory, as a first integrated phase current value, an amount by which the obtained phase current value exceeds a first phase current threshold, and accumulating, in the memory, as a second integrated phase current value, an amount by which the phase current value is smaller than a second phase current threshold that is smaller than the first phase current threshold;
        calculating, as a differential temperature value, a difference between a maximum temperature value and a minimum temperature value obtained from detected temperature detection values from a start of determination of temperature detection condition up to a present time; and
        based on the first integrated phase current value reaching or exceeding a first integrated phase current threshold and the second integrated phase current value reaching or exceeding a second integrated phase current threshold, while the differential temperature value does not reach or exceed a differential temperature threshold, detecting the temperature sensor sticking abnormality.

* * * * *